(12) United States Patent
Arnon (10) Patent No.: US 6,650,318 B1
(45) Date of Patent: Nov. 18, 2003

(54) DATA INPUT DEVICE

(75) Inventor: Boaz Arnon, Modlin (IL)

(73) Assignee: VKB Inc., Wilmington, DE (US)

( * ) Notice: Subject to any disclaimer, the term of this patent is extended or adjusted under 35 U.S.C. 154(b) by 195 days.

(21) Appl. No.: 09/687,141

(22) Filed: Oct. 13, 2000

(51) Int. Cl.⁷ ................................................ G09G 5/00
(52) U.S. Cl. ...................... 345/168; 345/156; 345/157; 345/158; 345/169; 345/173
(58) Field of Search ................ 345/156, 157, 345/158, 168, 169, 173

(56) References Cited

U.S. PATENT DOCUMENTS

| | | | |
|---|---|---|---|
| 4,843,568 A | 6/1989 | Krueger et al. | ............. 364/518 |
| 5,181,181 A | 1/1993 | Glynn | |
| 5,457,550 A | * 10/1995 | Baba et al. | ................... 359/18 |
| 5,767,842 A | * 6/1998 | Korth | ........................ 345/168 |
| 6,281,878 B1 | 8/2001 | Montellese | |
| 6,377,238 B1 | * 4/2002 | McPheters | ................... 345/156 |

FOREIGN PATENT DOCUMENTS

| | | | | |
|---|---|---|---|---|
| DE | 298 02 435 | | 5/1998 | |
| DE | 298 02 435 U1 | | 6/1998 | |
| EP | 0 982 676 A1 | | 6/1999 | |
| EP | 0 982 676 | | 3/2000 | |
| EP | 0982676 A1 | * | 3/2000 | ........... G06K/11/08 |
| WO | WO 00 21024 | | 4/2000 | |

* cited by examiner

*Primary Examiner*—Matthew C. Bella
*Assistant Examiner*—Tam Tran
(74) *Attorney, Agent, or Firm*—Pillsbury Winthrop LLP (57) ABSTRACT

A data input device including an optically generated image of a data input device, the image including at least one input zone actuable by an action performed thereon by a user, a sensor operative to sense the action performed on the at least one input zone, and to generate signals in response to the action, and a processor in communication with the sensor operative to process the signals for performing an operation associated with the at least one input zone.

46 Claims, 12 Drawing Sheets

DATA INPUT DEVICE

FIELD OF THE INVENTION

The present invention relates generally to data input devices, such as keyboards, and particularly to optically generated images of data input devices.

BACKGROUND OF THE INVENTION

Data input devices, such as keyboards, touch pads, calculator pads, telephone keypads, and the like, are well known devices with alphanumeric keys. Other data input devices, such as joysticks, mouses, trackballs and the like, generally do not have keys. Whatever the kind of input device, a user must generally press one or more keys or buttons in order to input data Data input devices are generally in wired communication with a computer terminal and the like, for controlling cursor movement, displaying commands, etc. Wireless cursor control systems have also been proposed, such as the system described in U.S. Pat. No. 5,181,181, the disclosure of which is incorporated herein by reference. This system includes a three-dimensional computer apparatus input device that uses three sets of accelerometers and angular rate sensors to determine acceleration, velocity, relative position and attitude of the device.

However, all of the known input devices have several drawbacks. Although tremendous technological advances have been made in computer and telecommunication hardware, nevertheless the data input device still remains a device with a relatively large amount of moving parts and electronics. In addition, mobile communication devices that use input devices such as keyboards, have a particular problem of balancing logistics and space. If a small keyboard is used, then the keys sometimes must be pressed several times just to indicate one character, making the device cumbersome to use. If a larger keyboard is used, then the device becomes too large to carry conveniently.

SUMMARY OF THE INVENTION

The present invention seeks to provide a novel and improved data input device. In the present invention, there is no physical input device, rather an optical image of a data input device is generated. A light beam emanating from a light source (e.g., laser source) is preferably moved by means of a mirror array or scanner, for example, at high speed to form a two-dimensional or three-dimensional image of an input device, such as a keyboard with all of the keys, in which case the user presses the "virtual" keys of the "virtual" optically generated keyboard. Another example of an optically generated input device is a "virtual" mouse, wherein pressing or touching an outlined area performs a "click". Other examples include "virtual" musical instruments, such as an organ, a "virtual" switch, a "virtual" telephone touch pad, and the like.

Preferably optical, acoustic, position or movement sensors sense the "pressing" or "striking" of the virtual keys, and the sensed movement is sent to a processor which processes and interprets the "pressing" into the desired characters, instructions, information and data, etc. The input may then be transmitted to a computer, mobile telephone, musical instrument, and the like. The laser and beam-moving apparatus are preferably housed in a unit approximately the same size as a cell phone, or even smaller. The laser and beam-moving apparatus may be provided separately from a cell phone, or may be a built-in unit manufactured integrally with the phone.

The present invention is particularly advantageous for mobile communication devices. A user can carry any conveniently small size cell phone, for example, plus the equivalently-sized laser unit of the invention. If the user wishes to type messages to be sent to the Internet via the cell phone, for example, the user simply generates a large size keyboard with the laser unit and comfortably types the commands and message, without having to grapple with multiple presses of keys or with too small keys, or with lugging a clumsy, large keyboard. The present invention thus enables user-friendly use of cell phones for communication on the Internet. The same holds true for palm-sized computer/calculators or PDAs (personal digital assistants).

The present invention also provides a multilingual keyboard heretofore impossible to achieve in the prior art. Current keyboards generally have at most two languages indicated on the keys, e.g., the local language and English. In the present invention, since the keys are "virtual", any language can be optically formed on the keys of the keyboard, and a suitable linguistic processor can interpret between the keyed-in language and any other language in which it is desired to transmit a message. This enables users of different languages from all over the world to communicate with each other with great ease.

In another aspect of the invention, the user can modify the arrangement, size and shape of the virtual keys. In still another aspect of the invention, a holographic image of all or part of the virtual keyboard can be employed.

The image of the virtual keyboard can be constructed by means of a monochromatic laser, or a blend of differently colored laser beams, either by using multiple laser sources having different colors and wavelengths, or by using a single laser source and using color and wavelength splitters. Differently polarized light beams can also be used. The keyboard of the present invention can not only be used as the sole data input device, but can also be integrated with other conventional or non-conventional data input devices.

There is thus provided in accordance with a preferred embodiment of the present invention a data input device including an optically generated image of a data input device, the image including at least one input zone actuable by an action performed thereon by a user, a sensor operative to sense the action performed on the at least one input zone, and to generate signals in response to the action, and a processor in communication with the sensor operative to process the signals for performing an operation associated with the at least one input zone.

In accordance with a preferred embodiment of the present invention a light source is provided which generates a light beam, and beam-moving apparatus is provided which moves the light beam to generate the optically generated image of the data input device.

Further in accordance with a preferred embodiment of the present invention the beam-moving apparatus includes a mirror arranged to reflect the light beam, and an actuator operatively connected to the mirror, wherein the actuator moves the mirror to reflect the light beam to form at least a two-dimensional image of the data input device.

Still further in accordance with a preferred embodiment of the present invention the beam-moving apparatus includes a scanner arranged to scan the light beam, and an actuator operatively connected to the scanner, wherein the actuator moves the scanner to scan the light beam to form at least a two-dimensional image of the data input device.

In accordance with a preferred embodiment of the present invention the data input device includes a key of a keyboard, a keyboard, a mouse with at least one input button or a key of a touch pad.

Further in accordance with a preferred embodiment of the present invention the sensor includes an optical sensor (such as a CCD or PSD), an acoustic sensor or a movement sensor.

Still further in accordance with a preferred embodiment of the present invention the processor is in communication with an output device, such as a computer, a mobile telephone, a switch or a palm-held computer/calculator.

There is also provided in accordance with a preferred embodiment of the present invention a method for data input including generating an optical image of a data input device, the image including at least one input zone actuable by an action performed thereon by a user, performing an action on the at least one input zone, sensing the action performed on the at least one input zone, generating signals in response to the action, and processing the signals for performing an operation associated with the at least one input zone.

In accordance with a preferred embodiment of the present invention the step of generating the optical image includes generating an image of a keyboard and the step of performing an action includes pressing keys of the image of the keyboard.

Further in accordance with a preferred embodiment of the present invention the step of processing the signals causes typing alphanumeric characters on a computer, cell phone, palm-sized computer/calculator or PDA.

In accordance with a preferred embodiment of the present invention the method further includes modifying the image of the keyboard so as to modify a configuration of keys of the keyboard.

Additionally in accordance with a preferred embodiment of the present invention the method further includes optically generating an image of characters of a first language on keys of the keyboard, selecting a second language different from the first language, and optically generating an image of characters of the second language on keys of the keyboard.

Further in accordance with a preferred embodiment of the present invention the optical image of the data input device is a holographic image.

Still further in accordance with a preferred embodiment of the present invention the optical image of the data input device is generated by means of a monochromatic laser.

Additionally in accordance with a preferred embodiment of the present invention the optical image of the data input device is generated by means of multiple laser sources having different colors and wavelengths.

In accordance with a preferred embodiment of the present invention the optical image of the data input device is generated by means of a single laser source and using color and wavelength splitters to split light from the single laser source.

Further in accordance with a preferred embodiment of the present invention the optical image of the data input device is generated by means of differently polarized light beams.

In accordance with a preferred embodiment of the present invention the step of sensing includes detecting light reflected from an object within a silhouette of the image, and analyzing a reflection of the light to determine a spatial position of the object.

Further in accordance with a preferred embodiment of the present invention the step of sensing includes providing a light beam emanating from a light source, detecting light reflected from an object within a silhouette of the image, corresponding to the light beam, and analyzing an angle of the light beam and a time for the beam to be reflected back from the object to a reference to determine a spatial position of the object.

Still further in accordance with a preferred embodiment of the present invention the reference includes an optically readable reference.

Additionally in accordance with a preferred embodiment of the present invention the optically readable reference includes a tangible bar code strip or an optically generated bar code strip.

In accordance with a preferred embodiment of the present invention the optical image of a data input device is generated by the same light beam whose reflection is used to determine the spatial position of the object.

Further in accordance with a preferred embodiment of the present invention the step of sensing includes providing a non-visible-light beam emanating from a non-visible-light source, detecting an image of the non-light impinging upon an object within a silhouette of the image of the data input device, and analyzing the image of the non-light to determine a spatial position of the object.

Still further in accordance with a preferred embodiment of the present invention the non-visible-light beam includes an infrared beam and the image of the non-light includes an infrared image of the object.

In accordance with a preferred embodiment of the present invention the object includes a finger and the step of analyzing includes analyzing a difference in the infrared images of the finger before and after pressing the finger.

Further in accordance with a preferred embodiment of the present invention the method includes detecting light reflected from an object within a silhouette of the image and preventing the image from impinging upon the object.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
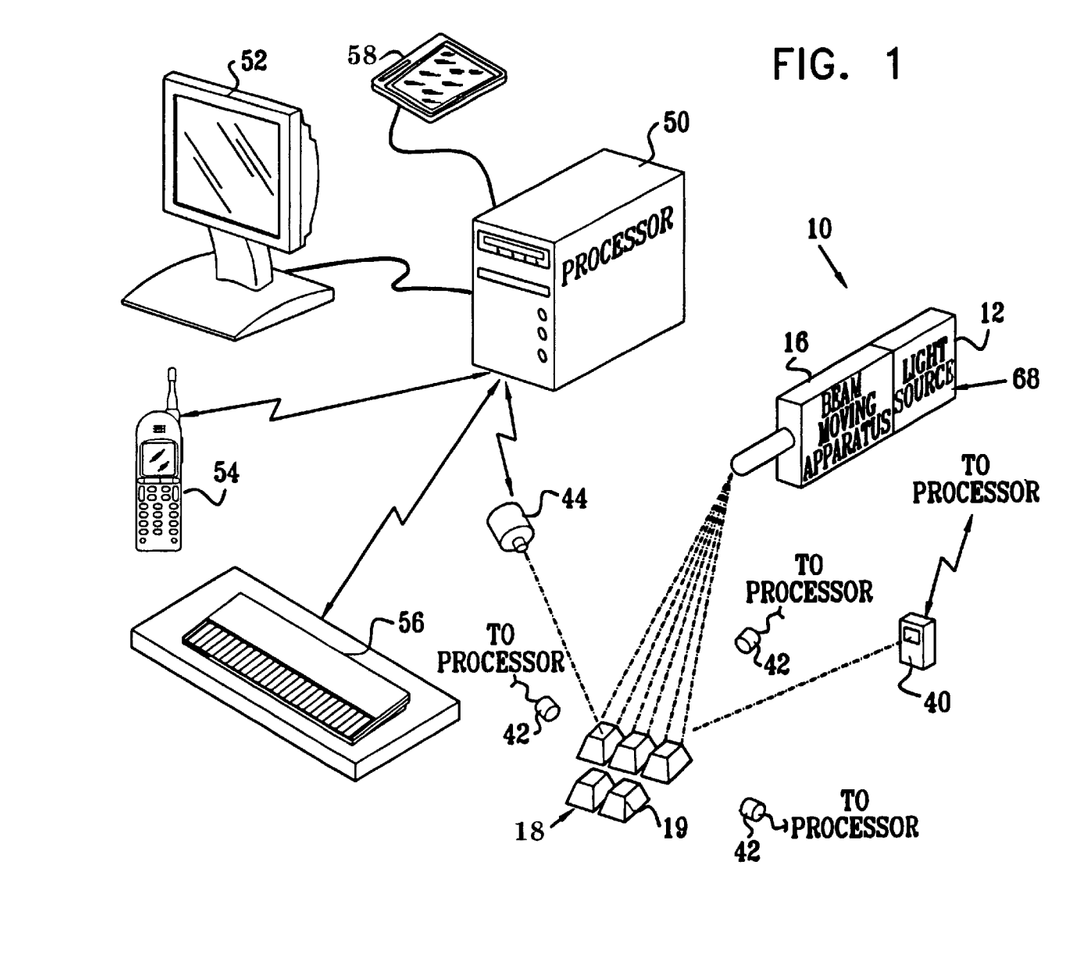
FIG. 1 is a simplified pictorial illustration of a data input device constructed and operative in accordance with a preferred embodiment of the present invention.
Figure 2:
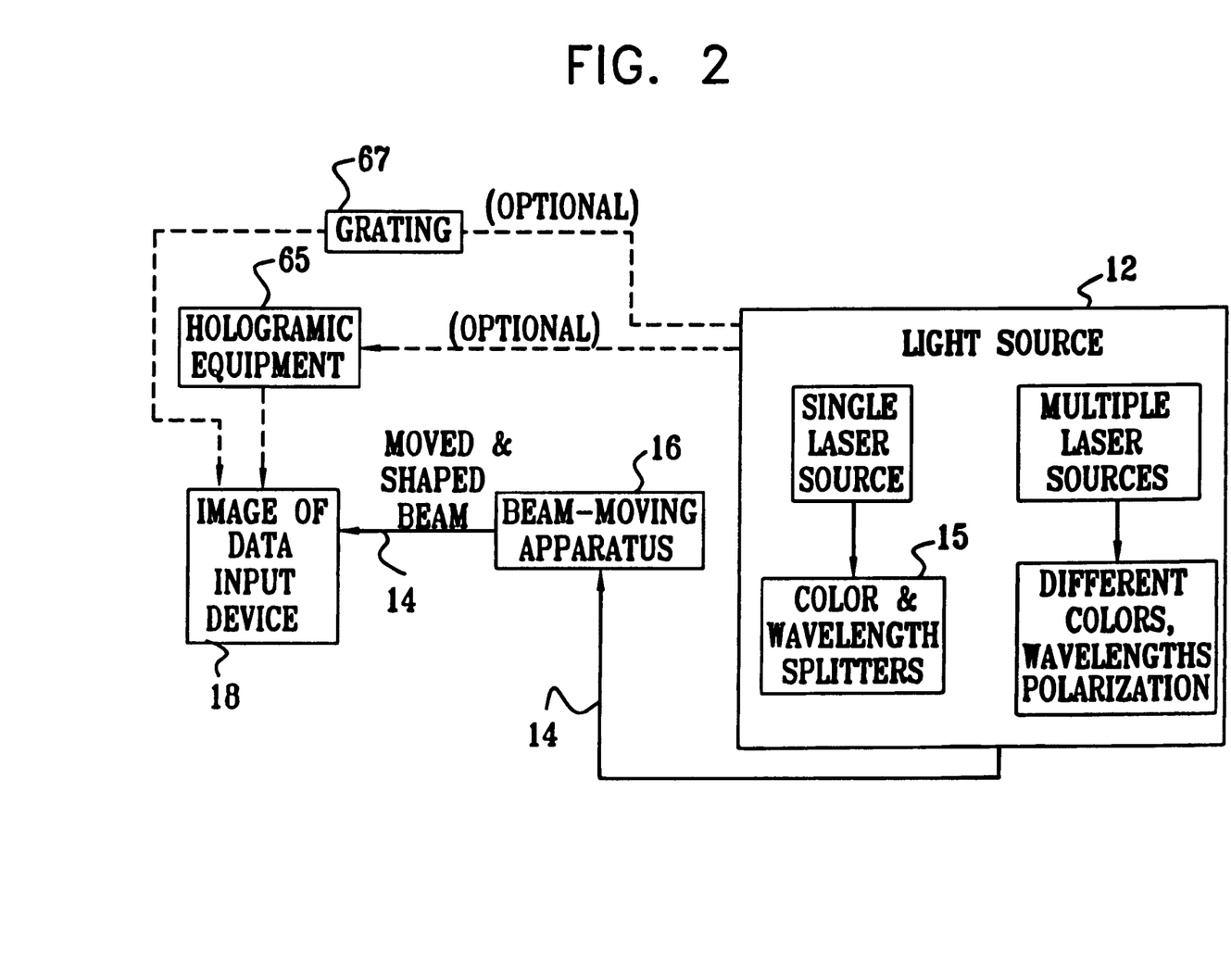
FIG. 2 is a simplified block diagram of the data input device of FIG. 1.

Reference is now made to FIGS. 1 and 2 which illustrate a data input device 10 constructed and operative in accordance with a preferred embodiment of the present invention. Data input device 10 preferably includes a light source 12 which generates a light beam 14. In accordance with one preferred embodiment of the present invention, light source 12 is a single laser source, such as a monochromatic laser. Color and wavelength splitters 15 may be provided to split light from the single laser source. Alternatively, multiple laser sources 12 having different colors and wavelengths, may be employed. Additionally or alternatively, light source 12 may generate differently polarized light beams.

Figure 3A:
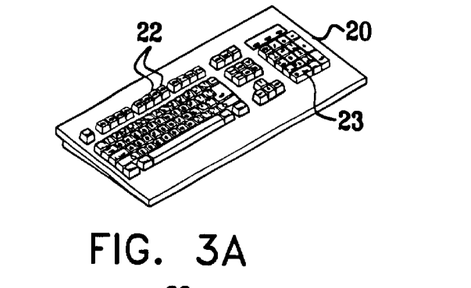
FIGS. 3A–3E are simplified pictorial illustrations of optically generated images of data input devices, constructed and operative in accordance with different preferred embodiments of the present invention.

Beam-moving apparatus 16, described more in detail hereinbelow, is preferably arranged with respect to light source 12 such that it moves light beam 14 to generate an optically generated image 18 of a data input device. Image 18 of the data input device preferably includes one or more input zones 19 actuable by an action performed thereon by a user, as will be readily understood by examples of images 18 shown in FIGS. 3A–3E. In FIG. 3A, an image of a keyboard 20 with keys 22 is generated. Keys 22 are the input zones, and a user "presses" keys 22 to input data. The manner in which the pressing is detected is described hereinbelow. Image 18 may include not only the silhouette of keys 22 but also alphanumeric characters 23 formed in the outline of each key 22.

Figure 3B:
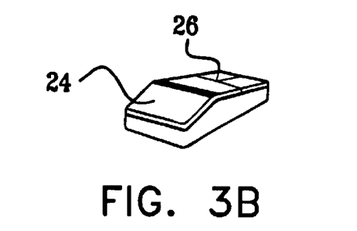
Figure 3C:
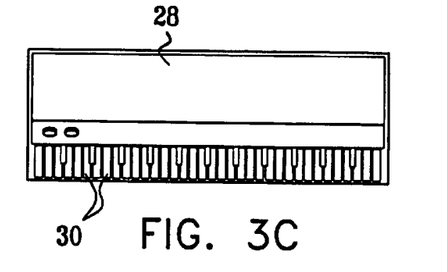

FIG. 3B illustrates another example of an optically generated input device, that of a mouse 24, wherein pressing or touching an outlined area of a button 26 performs a "click". Alternatively, moving a user's finger in the outlined area can also perform a function. Another example, shown in FIG. 3C, includes an optically generated image of a musical instrument 28, such as an organ with keys 30, wherein "pressing" keys 30 can generate musical notes.

Figure 3D:
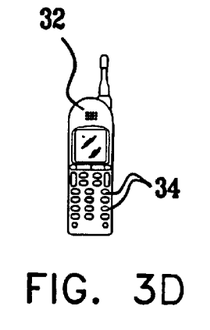
Figure 3E:
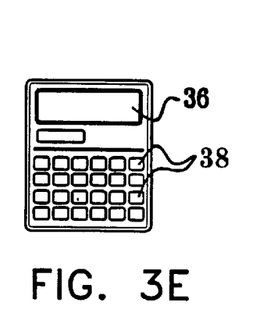

In FIG. 3D, an optically generated image of a touch pad 32, such as for a telephone, is provided with pad keys 34, wherein "pressing" one of keys 34 can generate alphanumeric characters. In FIG. 3E, an optically generated image of palm-held computer/calculator (or any other kind of PDA) 36 is provided with keys or buttons 38, wherein "pressing" one of keys or buttons 38 can generate mathematical functions or alphanumeric characters. The pad keys 34 or keys 38 are also examples of "virtual" PDA switches that can be optically generated. Of course, any kind of switch can be optically generated, such as single-pole and multi-pole switches, for example.

A sensor is preferably provided to sense the above described actions performed on the input zone 19. Many kinds of sensors can be employed to detect pressing any of the "virtual" keys of the embodiments shown in FIGS. 3A–3E. For example, as seen in FIG. 1, the sensor may be an optical sensor 40, such as an electronic camera, CCD or position sensing device (PSD), whose field of view encompasses the "virtual" keyboard or touch pad, etc. Other examples of suitable sensors include an acoustic sensor 42 and a position or movement sensor 44. Three acoustic sensors 42 should preferably be used for sensing the action by means of triangulation. Any number of position or movement sensors can be used, and more than one kind of sensor can be employed in carrying out the invention. Other examples of suitable sensors are described hereinbelow with reference to FIGS. 8–10.

The sensors, upon sensing the "pressing" or "striking" of the "virtual" keys, preferably generate electrical signals based upon the sensed information and transmit them to a processor 50 which processes and interprets the signals into the desired characters, instructions, information and data, input by the user. Processor 50 is preferably in electrical communication with an output device, such as a computer 52, mobile telephone 54, musical instrument 56, palm-held computer/calculator 58, and the like, which visually or audibly output the desired characters, instructions, information and data.

Figure 4A:
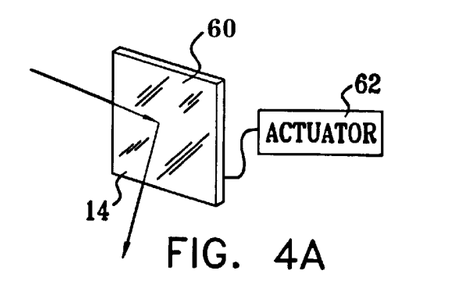
FIG. 4A is a simplified pictorial illustration of beam-moving apparatus constructed and operative in accordance with a preferred embodiment of the present invention, including a mirror array with actuators for moving the array.
Figure 4B:
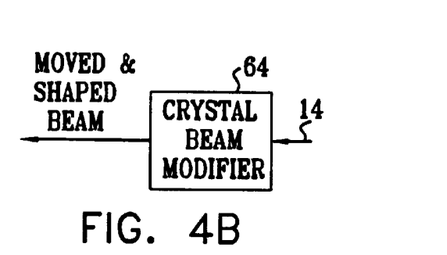
FIG. 4B is a simplified pictorial illustration of beam-moving apparatus constructed and operative in accordance with another preferred embodiment of the present invention, including a crystal beam modifier.
Figure 4C:
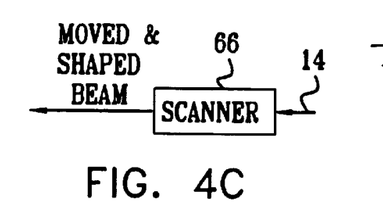
FIG. 4C is a simplified pictorial illustration of beam-moving apparatus constructed and operative in accordance with yet another preferred embodiment of the present invention, including a scanner.

In accordance with a preferred embodiment of the present invention, as shown in FIG. 4A, beam-moving apparatus 16 includes a mirror array 60 (one or more mirrors) arranged to reflect light beam 14, and an actuator, such as a servomotor 62, operatively connected to mirror array 60. Servomotor 62 preferably rapidly moves mirror array 60 to reflect light beam 14 to form a two-dimensional or three-dimensional image of data input device 10. Another example is shown in FIG. 4B, wherein beam-moving apparatus 16 includes a crystal beam modifier 64. FIG. 4C illustrates yet another example of beam-moving apparatus 16, that of a scanner 66. In all cases, light beam 14 is rapidly moved to form a two-dimensional or three-dimensional image of data input device 10. Alternatively, a holographic image of data input device 10 can be produced by hologramic equipment 65 (FIG. 2). As another alternative, an image of data input device 10 can be produced by a grating 67 (FIG. 2).

Light source 12 and beam-moving apparatus 16 are preferably housed in a laser unit 68 (FIG. 1) approximately the same size as a cell phone. This makes the present invention particularly advantageous for mobile communication devices. For example, a user can carry any conveniently small size cell phone, for example, plus the equivalently-sized laser unit 68. If the user wishes to type messages to be sent to the Internet via the cell phone, for example, the user simply generates a large size keyboard with laser unit 68 and comfortably types the commands and message, without having to grapple with multiple presses of keys or with too small keys, or with lugging a clumsy, large keyboard. The present invention thus enables user-friendly use of cell phones for communication on the Internet. The same holds true for palm-sized computer/calculators, and other small data input devices. It is noted that the data input devices 10 of the present invention can not only be used as the sole data input device, but can also be integrated with other conventional or non-conventional data input devices.

Figure 5:
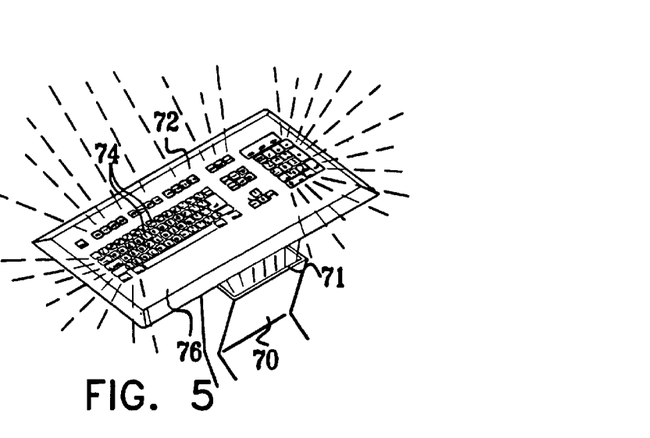
FIG. 5 is a simplified pictorial illustration of a data input device constructed and operative in accordance with another preferred embodiment of the present invention, including a light unit that projects an optical image of a data input device by projecting light from underneath a transparent or translucent substrate.

Although the above described laser unit 68 is considered the most preferred embodiment, nevertheless other light units can be used to generate the optical image of the data input device. For example, as shown in FIG. 5, a light unit 70 may project an optical image 72 of a data input device 74, such as a keyboard, by projecting light from underneath a transparent or translucent substrate 76. A reticle 71 may be provided with a template of the keyboard for producing the image, for example. The sensing of "pressing" the keys of the keyboard and processing signals generated by the sensor is preferably as described hereinabove.

Figures 6, 7:
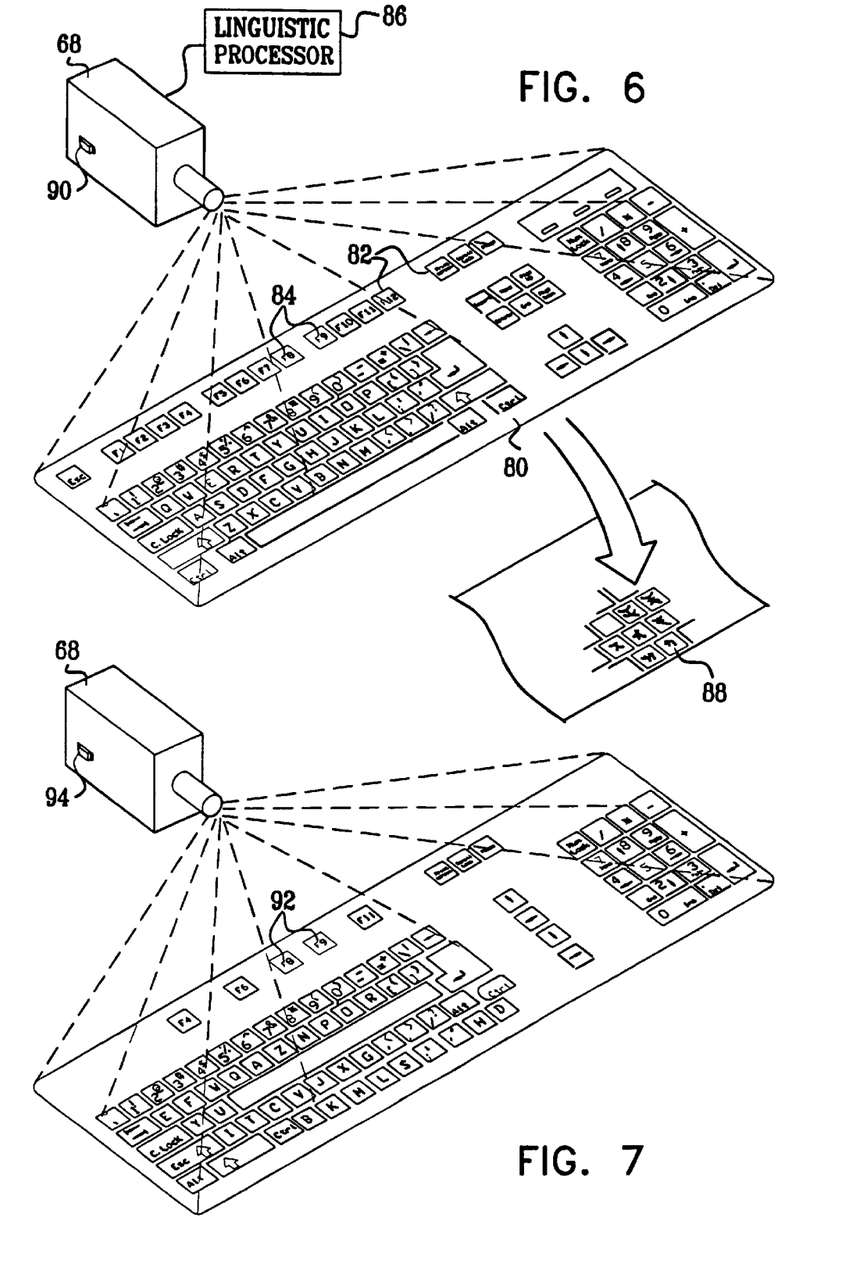
FIG. 6 is a simplified illustration of a multilingual keyboard, constructed and operative in accordance with a preferred embodiment of the present invention.
FIG. 7 is a simplified illustration of a non-standard layout of keys on an optically generated image of a keyboard, wherein a user can modify the arrangement, size and shape of the "virtual" keys, in accordance with a preferred embodiment of the present invention.

Reference is now made to FIG. 6 which illustrates a multilingual keyboard 80, constructed and operative in accordance with a preferred embodiment of the present invention. Keyboard 80 is preferably formed by laser unit 68, described hereinabove. Laser unit 68 preferably forms a silhouette of keys 82 with alphanumeric characters 84 formed in the outline of each key 82. In the embodiment of FIG. 6, a linguistic processor 86 is in electrical communication with laser unit 68. Linguistic processor 86 is operative to form an optical image of letters of any alphabet, as chosen by the user.

The user can choose the particular language in a number of ways. For example, as shown in FIG. 6, laser unit 68 can first display a standard "qwertyuiop" layout of keys 82 in English. The user can then type in English the desired language, other than English, and laser unit 68 promptly generates a different set of keys 88 configured to the chosen language. Additionally or alternatively, switches 90 may be provided for switching between languages. It is important to note that the different set of keys 88 does not necessarily have the same amount or layout as the standard "qwertyuiop" layout of keys 82 in English. Linguistic processor 86 is operative to interpret between the keyed-in language and any other language in which it is desired to transmit a message. For example, a Japanese user interested in a website of a Hungarian company, can command laser unit 68 to generate an optical image of a Japanese keyboard, and type a message in Japanese. Linguistic processor 86 then translates the Japanese message into Hungarian, and directs the translated message to the website.

It is noted that linguistic processor 86 may be locally connected to data input device 10, and may be part of its hardware. Alternatively, linguistic processor 86 can be provided on a remote server, such as in the Internet, and remotely accessed. The latter feature enables having an international linguistic interface for global communication.

Reference is now made to FIG. 7 which illustrates that laser unit 68 can display a non-standard layout of keys 92. In accordance with a preferred embodiment of the present invention, the user can modify the arrangement, size and shape of keys 92, such as by typing in commands which are interpreted and processed by processor 50 to generate the desired arrangement. Additionally or alternatively, switches 94 or other hardware may be provided for selecting an arrangement of keys 92.

Figure 8:
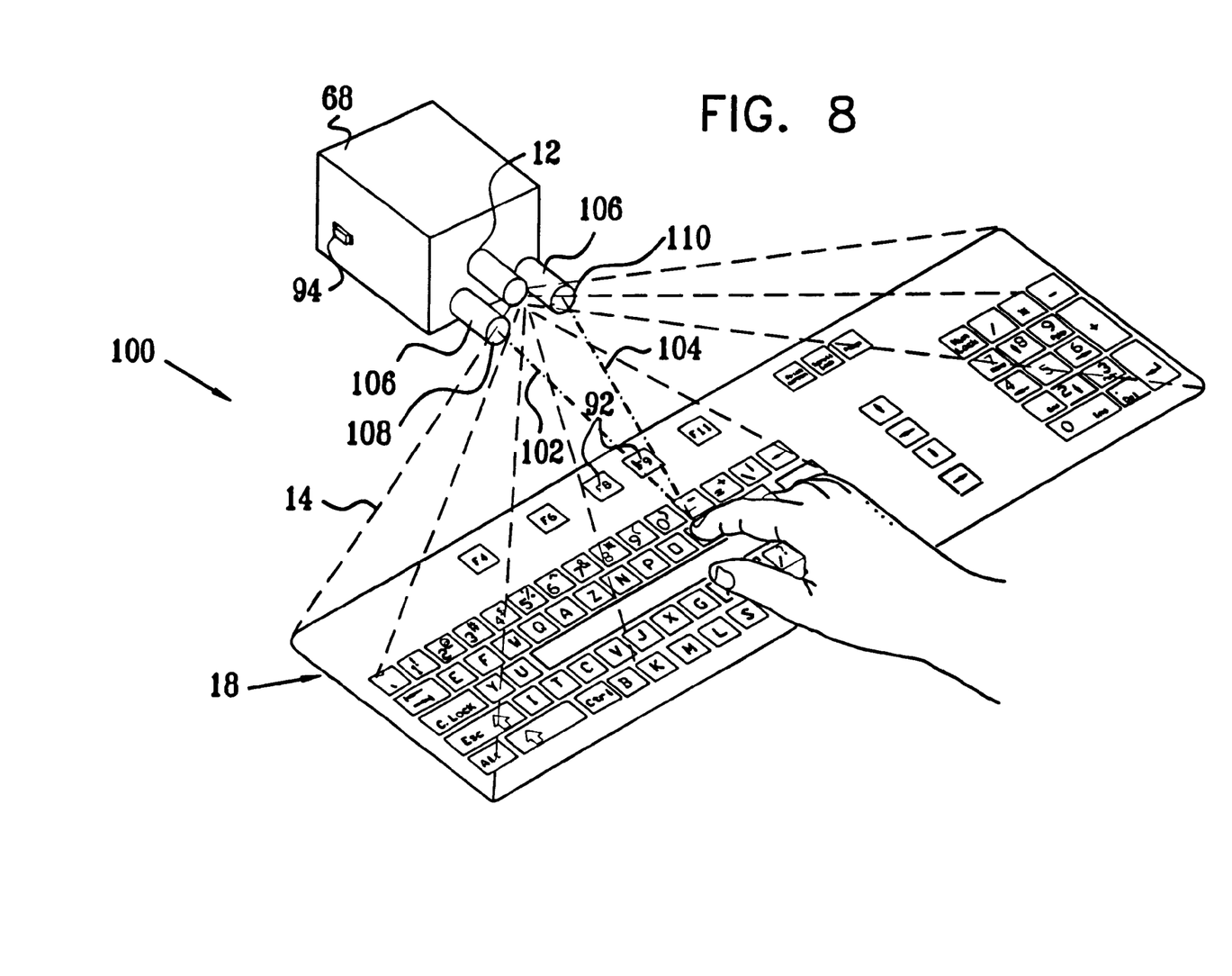
FIG. 8 is a simplified illustration of an optical sensor system for sensing input of data in any of the data input devices of the invention, constructed and operative in accordance with a preferred embodiment of the present invention, which uses two light beams to determine the position of the data input.

Reference is now made to FIG. 8 which illustrates an optical sensor system 100 for sensing input of data in any of the data input devices of the present invention, constructed and operative in accordance with a preferred embodiment of the present invention. Optical sensing system 100 preferably includes two light beams 102 and 104, different from light beam 14, to determine the position of the data input. Light beams 102 and 104 may emanate from light source 12 or one or more additional light sources 106. Light beams 102 and 104 preferably cover the entire area of image 18, either by means of scanning or by having sufficient beam width to cover the entire area.

Figures 9A, 9B:
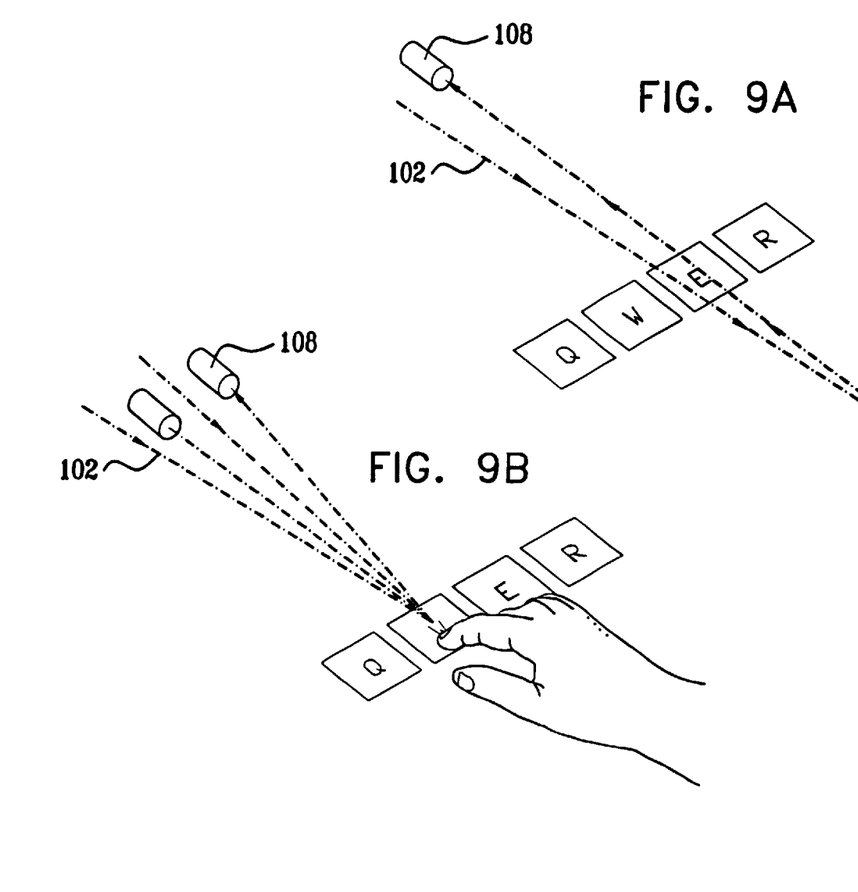
FIG. 9A is a simplified illustration of a light beam passing over the light-generated data input device of FIG. 8, with no object placed on the input zones.
FIG. 9B is a simplified illustration of a light beam passing over the light-generated data input device of FIG. 8, with an object placed on one of the input zones.

A pair of light detectors 108 and 110 are preferably provided for detecting any light reflected from objects within the silhouette of image 18, corresponding to light beams 102 and 104, respectively. For example, as seen in FIG. 9A, if no object is in the silhouette of image 18, then light beam 102 has one type of reflection which is detected by light detector 108. However, as seen in FIG. 9B, if a finger or other object is placed on one of input zones 19 of image 18, then light beam 102 has a new and different reflection detected by light detector 108. The same holds true for light beam 104. By analyzing the reflection of one of the light beams (102 or 104), such as with processor 50, the system knows the angle relative to the light source at which the object lies. By analyzing both of the reflections of light beams 102 and 104 and their intersection, the system knows the spatial position of the object. Finally, when the finger moves to press the virtual input zone 19, the movement of the finger causes yet another different set of reflections of light beams 102 and 104. The new reflections are analyzed to sense which input zone 19 was "pressed".

Figure 10:
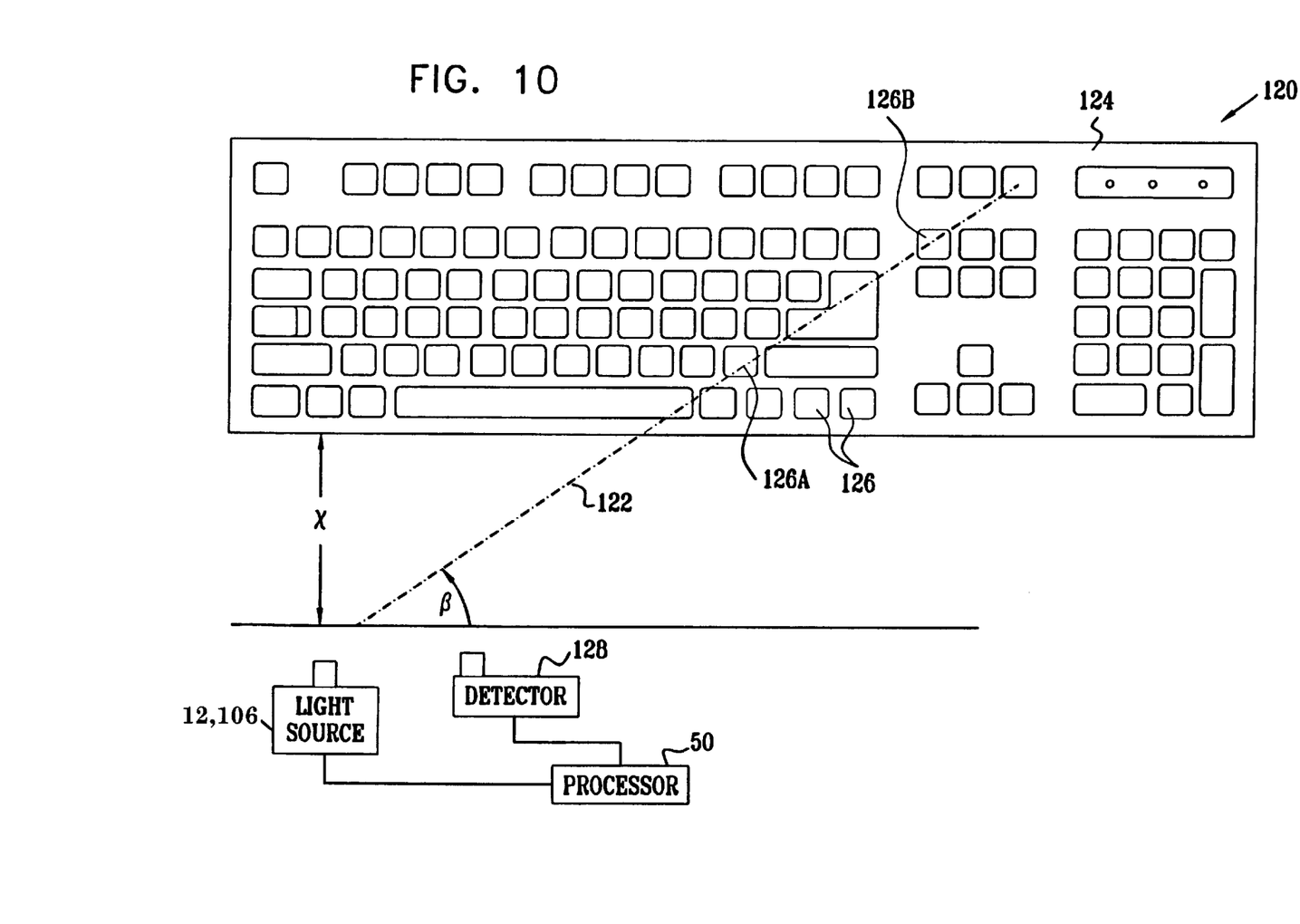
FIG. 10 is a simplified illustration of an optical sensor system for sensing input of data in any of the data input devices of the invention, constructed and operative in accordance with another preferred embodiment of the present invention, which uses one light beam to determine the position of the data input.

Reference is now made to FIG. 10 which illustrates an optical sensor system 120 for sensing input of data in any of the data input devices of the present invention, constructed and operative in accordance with another preferred embodiment of the present invention. Optical sensing system 120 differs from optical sensing system 100 in that optical sensing system 120 preferably includes one light beam 122 to determine the position of the data input. Light beam 122 may emanate from light source 12 or additional light source 106. Light beam 122 preferably covers the entire area of image 18, either by means of scanning or by having sufficient beam width to cover the entire area.

As seen in FIG. 10, light source 12 or 106 is preferably located at a fixed, known distance x from a "virtual" keyboard 124. For a given angle, such as angle β, there are a plurality of "virtual" keys 126 in the path of light beam 122. The time for light beam 122 to impinge on a finger or other object placed on one of keys 126 and be reflected back to a light detector 128 is a function of the distance of the key 126 from light source 12 or 106. For example, the time for light beam 122 to be reflected from key 126A may 12 be 60 picoseconds whereas the time for light beam 122 to be reflected from key 126B may be 100 picoseconds. Processor 50 preferably analyzes the angle and time data for light beams 122 and derives the spatial position of the finger. Finally, when the finger moves to press the particular key 126, the movement of the finger causes a different reflection of light beam 122. The new reflection is analyzed to sense which key 126 was "pressed".

Figure 11:
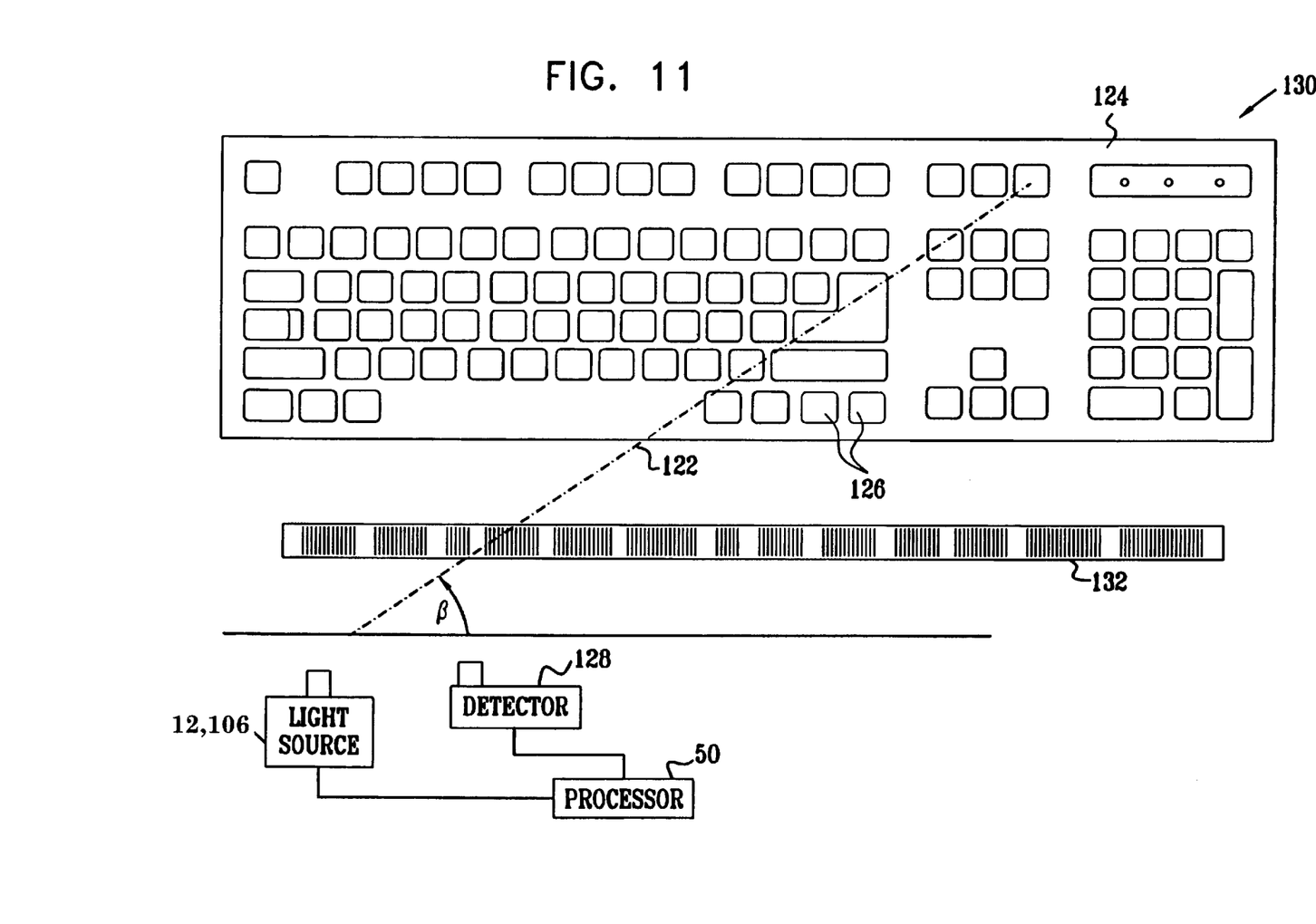
FIG. 11 is a simplified illustration of an optical sensor system for sensing input of data in any of the data input devices of the invention, constructed and operative in accordance with yet another preferred embodiment of the present invention, wherein a bar code reference is used to determine the position of the data input.

Reference is now made to FIG. 11 which illustrates an optical sensor system 130 for sensing input of data in any of the data input devices of the present invention, constructed and operative in accordance with yet another preferred embodiment of the present invention. Optical sensing system 130 is preferably similar to the previously described optical sensing system 120, with like elements being designated by like numerals.

In optical sensing system 120, light source 12 or 106 is preferably located at a fixed, known distance from keyboard 124 in order to determine the distance to the particular finger or object. Optical sensing system 130 differs from optical sensing system 120 in that sensing system 130 preferably uses an optically readable reference 132, such as a bar code, as a reference for determining the distance to the particular finger or object. Optically readable reference 132 may be a tangible bar code strip placed on a working surface by the user. Alternatively, optically readable reference 132 may be optically generated just like keyboard 124.

For a given angle, such as angle β, light beam 122 not only crosses over a plurality of keys 126, but also impinges upon a particular region of optically readable reference 132. The particular place of impingement on optically readable reference 132 uniquely determines the angle of light beam 122. Processor 50 can proceed to analyze the angle and time data for light beams 122 and derive the spatial position of the finger, as described hereinabove with reference to FIG. 9.

The embodiments of FIGS. 8–11 have been described such that the light beams 102, 104 and 122 used to sense the input of data are different from the light beam 14 used to create the virtual keyboard. Alternatively, with appropriate circuitry or software, light beam 14 itself can be used as the light beam used to sense the input of data.

Figure 12:
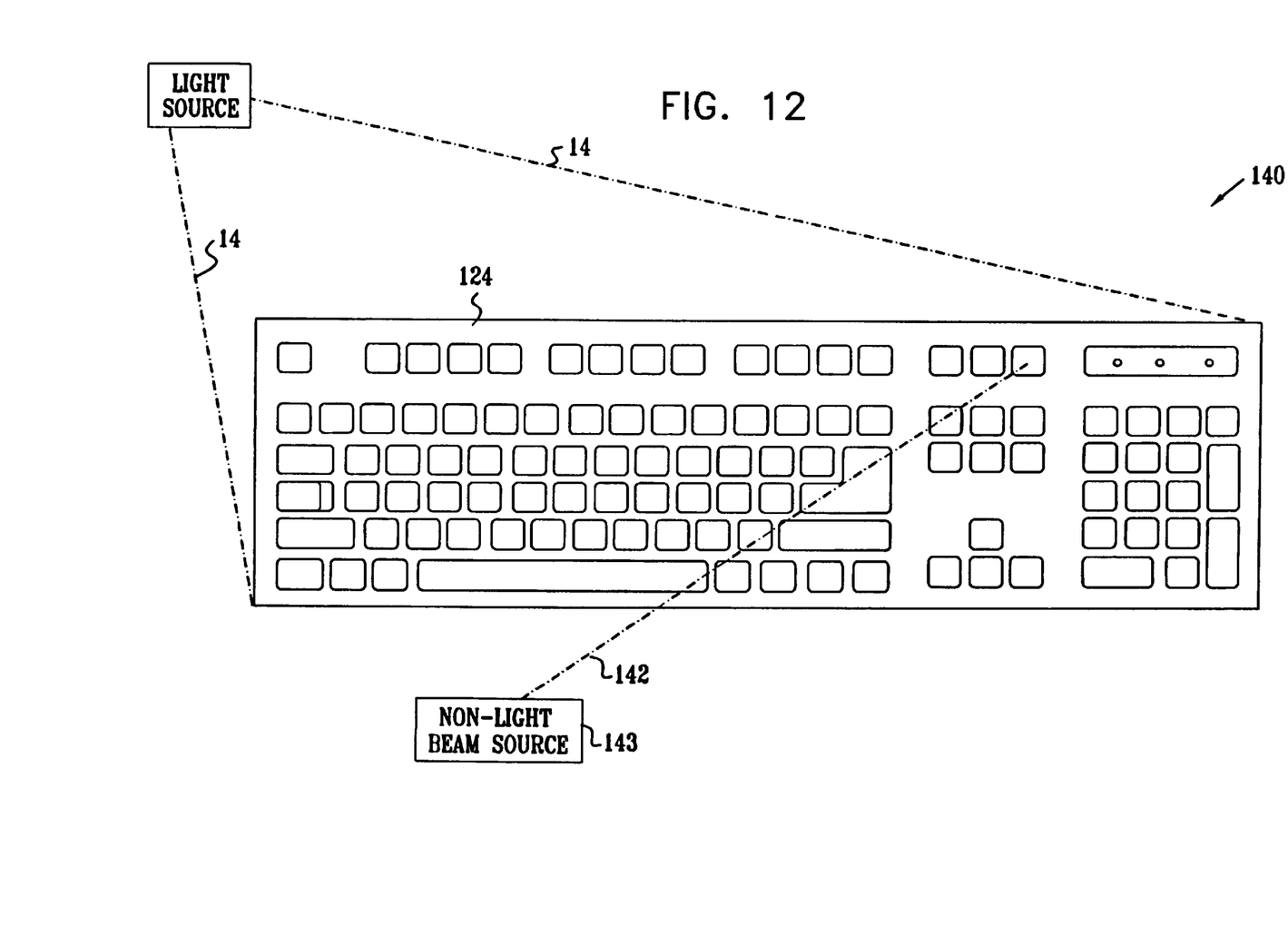
FIG. 12 is a simplified illustration of a sensor system for sensing input of data in any of the data input devices of the invention, constructed and operative in accordance with another preferred embodiment of the present invention, wherein a non-visible-light beam is used to determine the position of the data input.

Reference is now made to FIG. 12 which illustrates a sensor system 140 for sensing input of data in any of the data input devices of the present invention, constructed and operative in accordance with yet another preferred embodiment of the present invention. Sensing system 140 is preferably similar to the previously described optical sensing systems 120 and 130, with like elements being designated by like numerals. Sensing system 140 differs from the previous optical sensing systems 100, 120 and 130 in that sensing system 140 preferably includes a non-visible-light beam 142 emanating from a non-visible-light source 143 to determine the position of the data input. Non-visible-light beam 142 is any beam of electromagnetic wave radiation whose wavelength is outside the range of visible light. Alternatively, non-visible-light beam 142 can be an acoustic beam. Most preferably, beam 142 is an infrared beam. Beam 142 preferably covers the entire area of image 18, either by means of scanning or by having sufficient beam width to cover the entire area.

Figure 13:
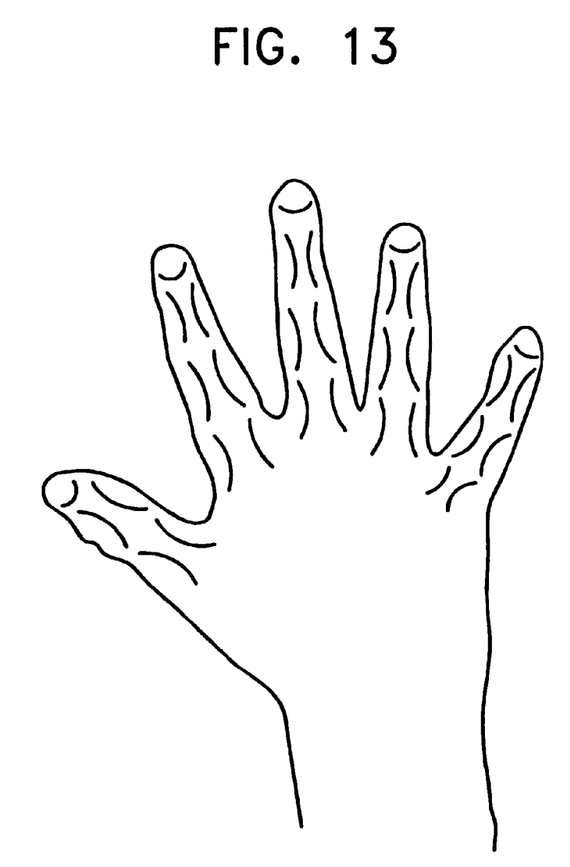
FIGS. 13 and 14 are simplified illustrations of two typical infrared images of fingers placed upon a "virtual" keyboard constructed in accordance with a preferred embodiment of the present invention.
Figure 14:
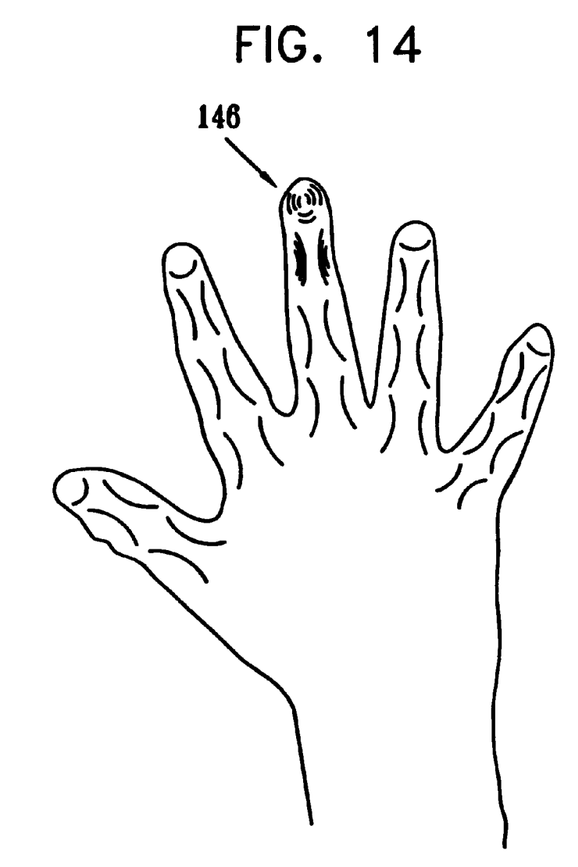

Reference is now made to FIGS. 13 and 14 which illustrate two typical infrared images of fingers placed upon the virtual keyboard 124. FIG. 13 shows an infrared image before one of the fingers presses a key 126. FIG. 14 shows an infrared image after pressing a key 126. It is seen that the act of pressing changes the blood flow to and from the tips of the fingers, and thus causes a different infrared image, such as seen at reference numeral 146. The difference in the infrared images between FIGS. 13 and 14, is preferably detected by an infrared detector 144 in electrical communication with processor 50. Processor 50 preferably analyzes the differences in the images and determines which key 126 was pressed.

Figure 15:
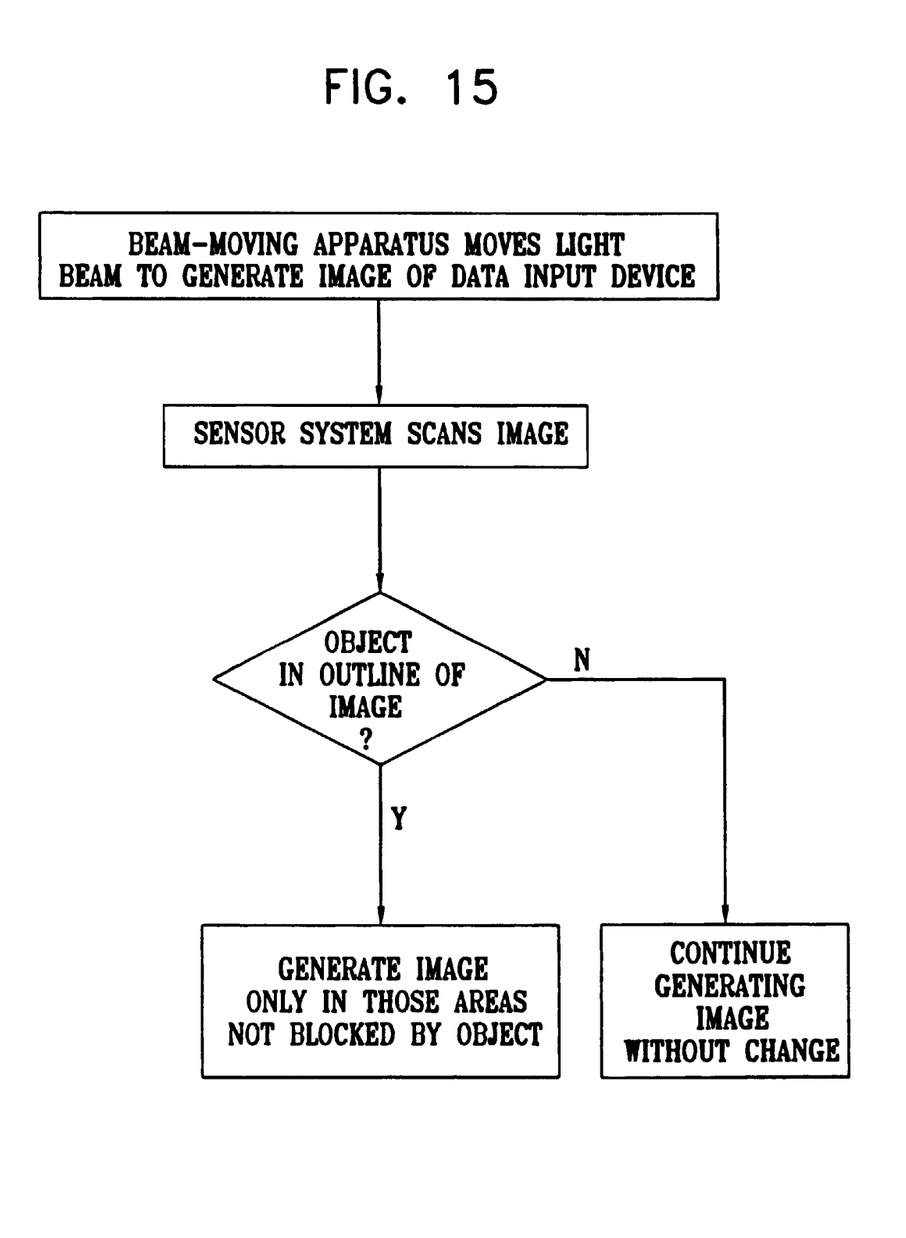
FIG. 15 is a simplified flow chart of a method for preventing displaying an image of a data input device on selected locations, in accordance with another preferred embodiment of the present invention.

When creating and projecting images of any of the data input devices of the present invention, it is possible that portions of the image may fall upon fingers of the user. Although this does not affect the operation of the invention, nevertheless some users may desire that no portion of the image fall on their fingers. Reference is now made to FIG. 15 which illustrates a method for preventing displaying an image of a data input device on selected locations, in accordance with another preferred embodiment of the present invention.

As described hereinabove, beam-moving apparatus 16 is arranged with respect to light source 12 such that it moves light beam 14 to generate optically generated image 18 of the data input device. Any of the above-described sensor systems 100, 120, 130 or 140 scans the image 18 to detect data input as described hereinabove. The sensor system also detects the presence of an object, e.g., a hand or finger, in the outline of image 18. Since processor 50 knows the exact position of the hand or finger is known, as well as the position of light beam 14, processor 50 can instruct beam-moving apparatus 16 and light source 12 to cause light beam 14 to generate the image 18 only in those regions not covered by the fingers.

It is noted that any of the above-described sensor systems 100, 120, 130 or 140 can be used to detect data input and the like even without being used in conjunction with the generation of image 18. For example, any of the sensor systems of the invention can be used to detect finger movement on a "regular", tangible keyboard.

Figure 16:
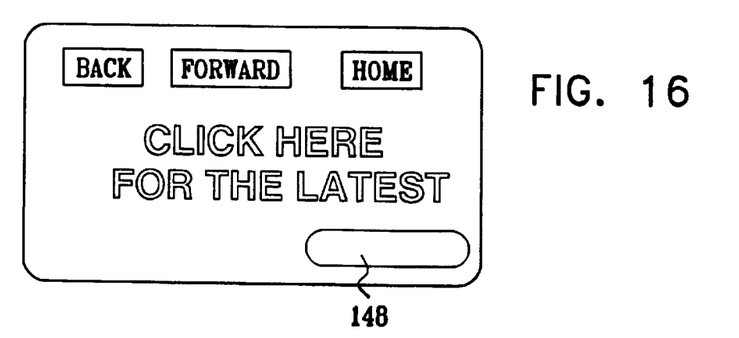
FIGS. 16 and 17 are simplified illustrations of generating images of data input devices in accordance with two preferred embodiments of the present invention, wherein in FIG. 16, a web page is light-generated, and wherein in FIG. 17, a game object is light-generated.
Figure 17:
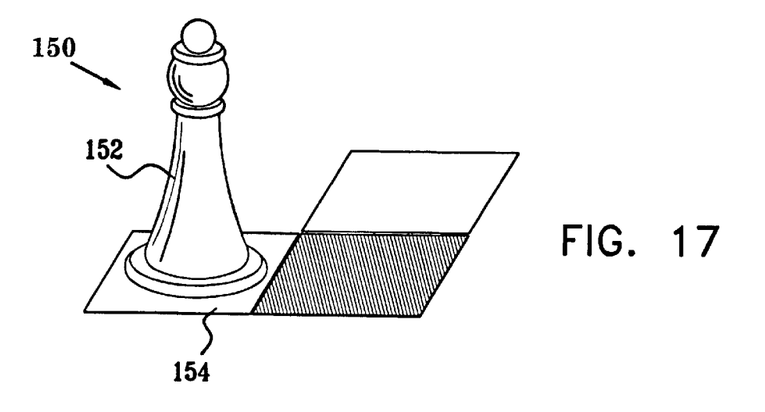

Reference is now made to FIGS. 16 and 17 which illustrate other examples of applications generating images of data input devices in accordance with preferred embodiments of the present invention. In FIG. 16, a light-generated web page is generated with any of the above-described apparatus for generating images of data input devices. A user can input data by "clicking" on a click zone 148, the click being detected as described hereinabove.

In FIG. 17, a light-generated game object 150, such as a chess piece 152 and chess board 154 are generated with any of the above-described apparatus for generating images of data input devices. A user can input data related to the game, such as "moving" the chess piece 152, with the input being detected as described hereinabove.

Figure 18:
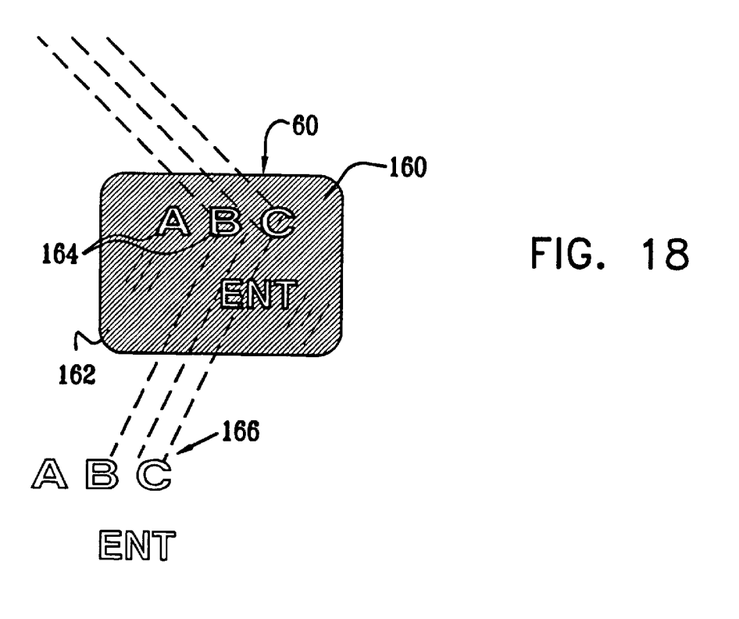
FIG. 18 is a simplified illustration of a mirror with one or more darkened portions for generating images of data input devices in accordance with another preferred embodiment of the present invention.

As mentioned hereinabove, laser unit 68 is considered the most preferred embodiment, but other light units can be used to generate the optical image of the data input device. Another example is shown in FIG. 18, mirror array 60

(described hereinabove with reference to FIG. 4A) may include a mirror 160 with a darkened portion 162 that does not reflect light, and clear portions 164 which do reflect light. The clear portions 164 are shaped like characters, numerals, letters or any other shape which it is desired to form a light-generated image 166 thereof.

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

What is claimed is:

1. A data input device comprising:
    an optically generated image of a data input device, said image comprising at least one input zone actuable by an action performed thereon by a user;
    a sensor operative to sense the action performed on said at least one input zone, and to generate signals in response to said action, said sensor being an optical position sensing device (PSD); and
    a processor in communication with said sensor operative to process said signals for performing an operation associated with said at least one input zone.

2. The device according to claim 1 and further comprising a light source which generates a light beam, and beam-moving apparatus which moves said light beam to generate said optically generated image of said data input device.

3. The device according to claim 2 wherein said beam-moving apparatus comprises a mirror arranged to reflect said light beam.

4. The device according to claim 3 and further comprising an actuator operatively connected to said mirror, wherein said actuator moves said mirror to reflect said light beam to form at least a two-dimensional image of said data input device.

5. The device according to claim 2 wherein said beam-moving apparatus comprises a scanner arranged to scan said light beam, and an actuator operatively connected to said scanner, wherein said actuator moves said scanner to scan said light beam to form at least a two-dimensional image of said data input device.

6. The device according to claim 1 wherein said data input device comprises a key of a keyboard.

7. The device according to claim 1 wherein said data input device comprises a keyboard.

8. The device according to claim 1 wherein said data input device comprises a mouse with at least one input button.

9. The device according to claim 1 wherein said data input device comprises a key of a touch pad.

10. A data input device comprising:
    an optically generated image of a data input device, said image comprising at least one input zone actuable by an action performed thereon by a user;
    a sensor operative to sense the action performed on said at least one input zone, and to generate signals in response to said action, said sensor being an acoustic sensor; and
    a processor in communication with said sensor operative to process said signals for performing an operation associated with said at least one input zone.

11. The device according to claim 1 wherein said processor is in communication with an output device.

12. The device according to claim 11 wherein said output device comprises at least one of a computer, a mobile telephone, a switch, and a palm-held computer/calculator.

13. A method for data input comprising:
    generating an optical image of a data input device, said image comprising at least one input zone actuable by an action performed thereon by a user;
    performing an action on said at least one input zone;
    sensing the action performed on said at least one input zone, said sensing comprising:
    detecting light reflected from an object within a silhouette of said image; and
    analyzing a reflection of said light to determine a spatial position of the object; generating signals in response to said action; and
    processing said signals for performing an operation associated with said at least one input zone.

14. The method according to claim 13 wherein the step of generating the optical image comprises generating an image of a keyboard and the step of performing an action comprises pressing keys of said image of said keyboard.

15. The method according to claim 14 wherein the step of processing said signals causes typing alphanumeric characters on at least one of a computer, cell phone, palm-sized computer/calculator and PDA.

16. The method according to claim 14 and further comprising modifying said image of said keyboard so as to modify a configuration of keys of said keyboard.

17. The method according to claim 14 and further comprising:
    optically generating an image of characters of a first language on keys of said keyboard;
    selecting a second language different from said first language; and
    optically generating an image of characters of said second language on keys of said keyboard.

18. The method according to claim 13 wherein said optical image of said data input device is a holographic image.

19. The method according to claim 13 wherein said optical image of said data input device is generated by means of a monochromatic laser.

20. The method according to claim 13 wherein said optical image of said data input device is generated by means of multiple laser sources having different colors and wavelengths.

21. The method according to claim 13 wherein said optical image of said data input device is generated by means of a single laser source and using color and wavelength splitters to split light from said single laser source.

22. The method according to claim 13 wherein said optical image of said data input device is generated by means of differently polarized light beams.

23. The method according to claim 13 wherein the step of sensing comprises:
    providing a light beam emanating from a light source;
    detecting light reflected from an object within a silhouette of said image, corresponding to said light beam; and
    analyzing an angle of said light beam and a time for the beam to be reflected back from said object to a reference to determine a spatial position of the object.

24. The method according to claim 23 wherein said reference comprises an optically readable reference.

25. The method according to claim 24 wherein said optically readable reference comprises a tangible bar code strip.

26. The method according to claim 24 wherein said optically readable reference comprises an optically generated bar code strip.

27. The method according to claim 23 wherein said optical image of a data input device is generated by the same light beam whose reflection is used to determine the spatial position of the object.

28. The method according to claim 13 wherein the step of sensing comprises:
   providing a non-visible-light beam emanating from a non-visible light source;
   detecting an image of said non-visible light impinging upon an object within a silhouette of said image of the data input device; and
   analyzing said image of said non-visible light to determine a spatial position of the object.

29. The method according to claim 28 wherein said non-visible light beam comprises an infrared beam and said image of said non-visible light comprises an infrared image of said object.

30. The method according to claim 13 and further comprising detecting light reflected from an object within a silhouette of said image and preventing said image from impinging upon said object.

31. A method according to claim 13 and wherein said sensing also comprises providing a light beam emanating from a light source.

32. A method according to claim 31 and wherein said sensing also comprises analyzing an angle of said light beam to determine a spatial position of the object.

33. A method for data input comprising:
   generating an optical image of a data input device, said image comprising at least one input zone actuable by an action performed thereon by a user;
   performing an action on said at least one input zone;
   sensing the action performed on said at least one input zone, said sensing comprising:
      providing a non-visible light beam emanating from a non-visible-light source;
      detecting an image of said non-visible light impinging upon an object; and
      analyzing said image of said non-visible light to determine a spatial position of the object;
   generating signals in response to said action; and
   processing said signals for performing an operation associated with said at least one input zone.

34. A method according to claim 33 and wherein said step of analyzing also comprises analyzing an angle of said light beam to determine a spatial position of the object.

35. The method according to claim 33 wherein the step of analyzing also comprises analyzing an angle of said light beam and a time for the beam to be reflected back from said object to a reference to determine a spatial position of the object.

36. A data input device comprising:
   an optically generated image of a data input device, said image comprising at least one input zone actuable by an action performed thereon by a user;
   a sensor operative to sense the action performed on said at least one input zone, and to generate signals in response to said action, said sensor being operative to:
      detect light reflected from an object within a silhouette of said image; and
      analyze a reflection of said light to determine a spatial position of the object; and
   a processor in communication with said sensor operative to process said signals for performing an operation associated with said at least one input zone.

37. The device according to claim 36 and further comprising a light source which generates a light beam, and beam-moving apparatus which moves said light beam to generate said optically generated image of said data input device.

38. The device according to claim 37 wherein said beam-moving apparatus comprises a mirror arranged to reflect said light beam.

39. The device according to claim 38 and further comprising an actuator operatively connected to said mirror, wherein said actuator moves said mirror to reflect said light beam to form at least a two-dimensional image of said data input device.

40. The device according to claim 37 wherein said beam-moving apparatus comprises a scanner arranged to scan said light beam, and an actuator operatively connected to said scanner, wherein said actuator moves said scanner to scan said light beam to form at least a two-dimensional image of said data input device.

41. The device according to claim 36 wherein said data input device comprises a key of a keyboard.

42. The device according to claim 36 wherein said data input device comprises a keyboard.

43. The device according to claim 36 wherein said data input device comprises a mouse with at least one input button.

44. The device according to claim 36 wherein said data input device comprises a key of a touch pad.

45. The device according to claim 36 and wherein said sensor analyzes an angle of determine a spatial position of the object.

46. The device according to claim 36 wherein said sensor analyzes an angle of said light and a time for said light to be reflected back from said object to a reference to determine a spatial position of the object.

* * * * *